March 28, 1933.    H. E. LA BOUR    1,902,960
PACKING GLAND
Filed Oct. 6, 1927

Witness:
William P. Kilroy

Inventor:
Harry E. LaBour
Brown, Boettcher & Diener
By
Attys

Patented Mar. 28, 1933

1,902,960

UNITED STATES PATENT OFFICE

HARRY E. LA BOUR, OF CHICAGO HEIGHTS, ILLINOIS

PACKING GLAND

Application filed October 6, 1927. Serial No. 224,349.

My invention relates to packing glands and is particularly adapted to forming a fluid tight joint for a shaft or rod where corrosive fluid is pumped, or for general purposes.

While I shall herein describe and illustrate a packing gland for packing a rotary shaft particularly adapted for use in handling corrosive fluid, it is to be understood that the invention is not to be limited to this particular service or the specific structure which I have herein described and illustrated.

In the handling of corrosive fluids it is often difficult to keep a tight packing gland because the fluid attacks the packing, in some cases destroying its lubricating qualities, and in some cases destroying its structure, thereby causing disintegration and the like.

I propose to employ block graphite or other equivalent material having the ability to resist corrosion and to provide a substantially antifriction bearing. This block graphite or equivalent material is the bearing material in contact with the moving shaft or rod. Since it is unyielding and yet is subject to wear, a tight cylindrical or peripheral bearing between it and the shaft cannot be maintained.

I prefer to make the engaging surfaces flat, i. e., plane surfaces, since both rotary motion and motion of translation may occur between such surfaces, and yet a substantially fluid tight joint maintained. To this end I provide a flat flange on the shaft and a flat ended ring or tube in endwise engagement with the same. The surfaces are kept in engagement preferably by a spring follower.

The space between the outer periphery of the ring and the casing or boss of the pump or the like, through which the shaft projects, is sealed off by a compressible fibrous packing or the equivalent thereof, bearing either upon the ring or upon the follower which forms a structural extension or mounting for said ring.

In the preferred form of my invention I provide two facing flanges on the shaft, one of which is inside the casing or hub of the pump, and the other outside the same. A ring is provided for each flange and the spring pressure which is employed for keeping the rings in engagement with the flanges may now be balanced out. At the same time, a double seal is provided.

I also provide means for supplying a lubricant between these two flanges which permits of lubricating the bearing surfaces from the center outwardly in both directions, and this assists also in sealing the space between the shaft and the rings and also the space between the shaft and the carrier.

There are numerous improvements in detail which will be apparent from the description of the specific embodiment herein disclosed.

Now in order to acquaint those skilled in the art with the manner of constructing and operating a device embodying my invention, I shall describe in connection with the accompanying drawing a specific embodiment of the invention.

In the drawing:—

Figure 1:
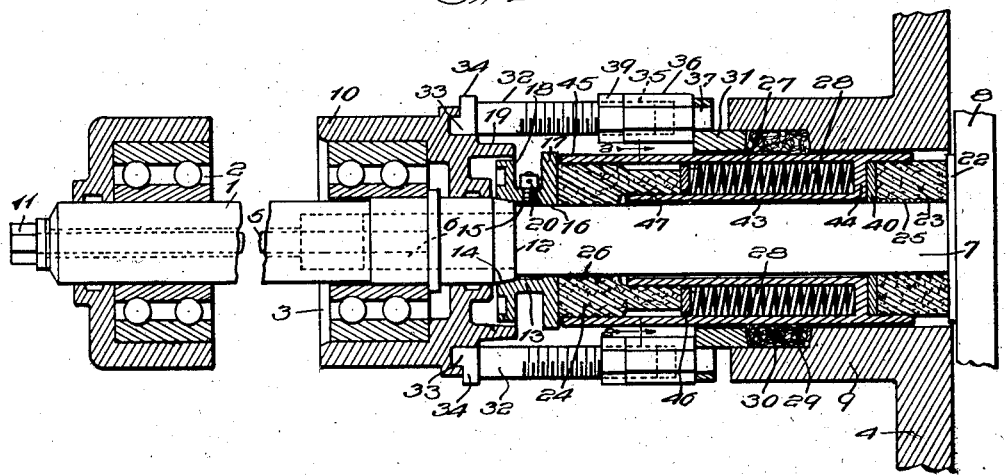
Fig. 1 is a longitudinal section through the gland and bearing assembly of a direct motor driven pump, the parts of the motor and pump which do not enter into the present invention being omitted for the sake of clearness.

Referring now to Fig. 1, the motor shaft 1 is mounted in suitable antifriction bearings 2 and 3 supported in the motor frame, which motor frame is also supported on a base which supports the pump body 4 shown at the right of Fig. 1.

The motor shaft 1 is hollow to receive the tension bolt 5. At its right hand end the motor shaft 1 is counterbored, preferably on a taper, to receive the reduced end 6 of the pump shaft 7. The pump shaft 7 has an impeller 8 mounted upon the right hand end thereof, and this impeller 8 lies inside the body or casing 4 of the pump, which body or casing 4 has a hub or hollow boss 9 projecting toward the bearing support 10 of the electric motor.

The motor shaft 1 and the pump shaft 7 are drawn together in alignment by the tension bolt 5 which has the head 11 at the opposite end of the shaft. The pump shaft 7 preferably has a shoulder 12 engaging the end surface of the motor shaft 1. A flange ring 13 is mounted over the joint between the pump shaft 7 and the motor shaft 1, this flange ring 13 having a tapered bore 14 at one end cooperating with the tapered end of the motor shaft 1, upon which said flange ring 13 is forced. An annular recess 15 is provided between the tapered bearing 14 and the cylindrical bearing 16 where the right hand end of the flange ring 13 bears upon the pump shaft 7. The pump shaft 7 is preferably made of a corrosion resisting metal, whereas the motor shaft 1 is preferably made of steel.

The flange ring member 13 has a bearing flange 17 with a plane surface facing to the right. It also has a throwing flange 18 housed within a housing or axially extending flange member 19 on the motor bearing 10 to throw off any liquid which might otherwise tend to creep along said flange ring onto the motor shaft.

A lubricating nipple 20, which may be of the usual check valve type, extends into communication with the annular space 15 and a lubricant, preferably a relatively viscous oil, is adapted to be forced into said space to fill and seal the same, and, in the case of the escape of any of said lubricant along the shaft 7 underneath the bearing 16, to lubricate parts of the packing.

The shaft 7 has, at its junction with the impeller 8, a plane flange 22 facing towards the left. Thus there are two flat flanges 17 and 22 on the shaft 7 rotating therewith and facing each other.

A ring of block graphite 23, having a flat planar end face, engages the flat face of the flange 22. Likewise, a graphite block 24 having a planar end face, engages the face of the flange 17, these flat surfaces of the blocks making fluid tight joints with the flat faces of the flanges.

The graphite blocks 23 and 24 are in the form of rings which embrace relatively closely the shaft 7 and thereby provide cylindrical bearings 25 and 26 with the corresponding parts of the shaft 7. However, a tight fit cannot be maintained between the shaft 7 and said cylindrical portion of the graphite rings since these rings are subject to wear and they cannot be shrunk inwardly to take up wear. The cylindrical surfaces at 25 and 26 are, however, provided with grooves to serve in the nature of labyrinth packing, which, in conjunction with the means for injecting a lubricant between these two rings, serves to assist in forming a seal between the shaft and the non-rotating part.

The graphite rings 23 and 24 are supported in a carrier member 27 which has a cylindrical exterior and which houses a series of compression springs 28—28 for applying endwise pressure to the rings 23 and 24 to maintain them in engagement with their cooperating flanges.

The carrier 27, which is cylindrical on its exterior, fits relatively closely within the hollow boss 9, said fit being loose enough however, to permit the carrier 27 to seat itself concentric with the shaft 7. The hollow boss 9 has a packing recess 29 in which there is disposed compressible packing material 30 to form a tight seal between the pump body and said carrier 27. The compressible packing 30 is engaged by a follower ring 31 and the packing is compressed by means of the studs 32—32 which have heads 33 of non-circular cross-section seated in non-circular recesses in the motor bearing support 10. The recesses are slotted out radially and the heads 33 have cooperating wings 34 lying in said recesses, whereby the heads of the studs 32 are prevented not only from escaping radially, but also from turning. The opposite ends of the bolts 32 project into hexagonal extensions 36 into which they are threaded. These bolt extensions 36 have pins 37 projecting into holes in the flange of the follower 31. Suitable lock nuts 39 are provided for locking the bolts 32 to the extensions 36.

At the right hand end the carrier member 27 has a counterbore or recess in which the graphite ring 23 is seated, a suitable yielding material 40 being disposed between the adjacent end of the graphite block 23 and the bottom of the recess or counterbore in the carrier, to take up the inequalities of surface and to provide a tight fit between these parts. The material 40 might harden after its application and a suitable cementitious material could be employed.

Figure 2:
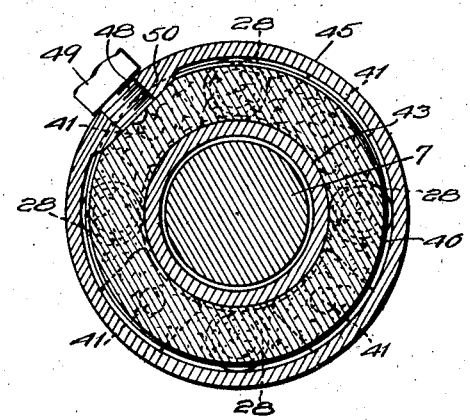
Fig. 2 is a cross-sectional view taken through the gland on the line 2—2 of Fig. 1.

The block 23 fits closely in said counterbore and is prevented from turning therein by a series of pins 41, shown in Fig. 2, these pins being mounted in the body of the carrier 27 and extending into recesses in the block 23. The carrier 27 has an inner cylindrical wall 43 integral with the end wall 44 and, hence, with the outer cylindrical wall. The springs 28 are disposed between said inner and outer walls of the carrier 27 in suitable pockets or seats provided therein as shown in Fig. 2. The springs 28 bear at their right hand ends against the end wall 44, and at their left hand ends they bear against spring followers 46 which, in turn, engage the right hand end face of the graphite block 24. The graphite block 24 is counterbored to receive the end of the inner wall 43 of the carrier 27, suitable grooves being formed in the inner peripheral cylindrical surface at 47, to provide a labyrinth packing.

The outer cylindrical periphery of the graphite ring 24 fits inside the outer wall 45 of the carrier 27 and is provided with a series of grooves to provide a similar labyrinth packing.

The carrier 27 has an opening 48 through the outer wall threaded to receive a pressure grease cup 49, part of which is shown in Fig. 2. This grease cup may rest against one of the bolts 32 to prevent turning of the carrier 27.

The ring 24 is prevented from turning by the provision of a flat spot lying in engagement with the inwardly extending boss 50 in which the seat for the grease cup is formed.

The grease from the pressure grease cup 49 enters the space between the right hand end of the ring 24 and fills the space in which the springs 28 are seated and, in fact, the entire interior of the carrier 27. Such grease as escapes along the bearing 47 and labyrinth packing therein, lubricates the adjacent ring 24, both as to its cylindrical bearing on the shaft 7 and also its endwise bearing on the flange 17, some of said lubricant also extending along the space between the inner wall 43 of the carrier 27 and the shaft 7 and lubricating the ring 23 on the shaft 7 and against the flange 22. The carrier 27 is preferably made of corrosion resisting material.

It will be apparent that either flange and its cooperating ring might be dispensed with and only one ring relied upon for a tight fit; but an unbalanced force would immediately be present tending to thrust the impeller endwise in the casing. In my pump, which is preferably of the character disclosed in my prior Patent No. 1,578,236, no separate bearing is provided for the pump shaft. The pump shaft 7 and the motor shaft 1 are keyed together at the point where they are telescoped into each other. By the provision of the double seal, I am able to dispense with any bearing load caused by the engagement of the rings with the flanges. It will be seen that the planar engagement of these two cooperating parts will remain tight, even with wear and even though the shaft 7 is not running absolutely true. In practice the shaft 7 is carefully trued and mounted in the bearings 2—3, but a small amount of lateral play cannot be prevented. Since the bearing faces are flat at right angles to the axis of the shaft, a motion of translation of the shaft is possible without loss of tightness at the bearing. Similarly, wear of the graphite block is readily taken up by the springs 28, which springs have sufficient strength to cause the carrier 27 to be pushed through the packing 30 to maintain engagement between the block 23 and the flange 22.

I do not intend to be limited to the details shown and described, except as they are recited in the appended claims.

I claim:—

1. In combination, a hollow boss adapted to receive a compressible packing, a rotatable shaft extending loosely through said boss and having a flat flange, a rigid antifriction ring embracing the shaft and having contact therewith and having a flat end face engaging said flat flange, said engaging faces maintaining a tight joint for rotary motion and for motion of translation between them, yielding means for holding said faces in engagement, a compressible packing for sealing the space between the ring and the boss, and means in the shaft embracing face of said ring for holding a sealing fluid between said face and the shaft.

2. In combination, a casing member adapted to receive a compressible packing, a rotatable shaft extending loosely through said casing and having a flat flange, a rigid antifriction ring embracing the shaft and having contact therewith and having a flat end face engaging said flat flange, a carrier for the ring, spring means for holding said flat faces in engagement, a compressible packing for sealing the space between the carrier and the casing, and means in the shaft embracing face of said ring for holding a sealing fluid between said face and the shaft.

3. In combination, a casing having a recess adapted to receive a compressible packing, a rotary shaft extending loosely through said casing, said shaft having a flat flange, a flat ended ring for engaging said flange, said ring having an inner surface containing a spiral groove and cooperating with the cylindrical surface of said shaft to hold a sealing fluid therebetween, a cylindrical carrier member for said ring, a compressible packing between said casing and said cylindrical carrier member, a spring for forcing said carrier member through said packing to maintain the flat bearing faces in engagement, and means for conducting a sealing fluid along said shaft through said spiral groove.

4. In combination, a casing having a hollow boss, a shaft projecting loosely through said hollow boss, a flange on the shaft within the casing, an external flange on the shaft spaced from said first named flange, a pair of ring members cooperating with said flange members, a carrier for said ring members and a packing between the hollow boss and the carrier member, said carrier member having spring means for forcing the rings against the cooperating flanges.

5. In combination, a shaft, a flange formed integral with the shaft, a flange ring removably mounted on the shaft, an annular carrier member surrounding said shaft, antifriction bearing rings carried by said carrier member for engagement with said shaft and said flange and flange ring, spring means carried by the carrier member for spreading said rings with respect to each other and forcing them into engagement with the flange members, and a housing enclosing said flange and being sealed to said carrier member.

6. In combination, a shaft having a pair of spaced facing flanges, an annular carrier member embracing the shaft between said flanges, a pair of rigid antifriction rings bearing endwise against said flanges, said rings being engaged and nonrotatably supported by said carrier member, and one of said rings having axial motion with respect to the surfaces of the carrier member that it engages, and spring means between said last named ring and the carrier member.

7. In combination, a shaft, a pair of facing flange members on the shaft spaced from each other, an annular carrier member surrounding the shaft between said flanges, a pair of cooperating bearing rings non-rotatably supported by said carrier member and engaging endwise against said flanges, and means for conducting a lubricant into the interior of the carrier member to permit the same to flow from the interior thereof to said bearing members.

8. In combination, a shaft, a flange integral with the outer end of the shaft, a separate flange ring embracing the shaft spaced from said first flange, said ring having an annular face on the interior thereof communicating with the surface of the shaft, a bearing ring adapted to engage each of said flanges, and a lubricating connection communicating with the space on the interior of said flange ring.

9. In combination, a motor shaft having bearings, a pump shaft piloted into the end of the motor shaft, a flange ring having a taper fit on the end of the motor shaft at one end and bearing on the pump shaft at the other end and having an interior annular space between said ends, and means for conducting a sealing fluid to said space to prevent the creepage of corrosive liquid to the motor shaft.

10. In combination, a housing having a hollow boss, a shaft projecting loosely through the boss, a pair of flanges on the shaft, one of said flanges being interior with respect to the boss and the other exterior with respect to the boss, a cylindrical carrier member embracing the shaft between said flanges, a yieldable packing between the boss and the carrier, an antifriction bearing ring non-rotatably seated in one end of the carrier, an antifriction bearing ring non-rotatably seated in the opposite end of the carrier member, a pocket in the carrier member for receiving a spring for urging said rings into engagement with the flanges, said second named ring cooperating with the external flange and serving to seal off the spring pocket.

11. In combination, a housing having a hollow boss, a shaft projecting loosely through the boss, a pair of flanges on the shaft, one of said flanges being interior with respect to the boss and the other exterior with respect to the boss, a cylindrical carrier member embracing the shaft between said flanges, a yieldable packing between the boss and the carrier, an antifriction bearing ring non-rotatably seated in one end of the carrier, an antifriction bearing ring non-rotatably seated in the opposite end of the carrier member, a pocket in the carrier member for receiving a spring for urging said rings into engagement with the flanges, said second named ring cooperating with the external flange and serving to seal off the spring pocket, and means for conducting a lubricant into said spring pocket.

12. In combination, a shaft having a pair of flanges facing each other, a pair of rings yieldingly pressed against said flanges, a carrier for said rings forming a substantially tight joint between said rings, and means for conducting a lubricant between the shaft and the carrier to lubricate said rings and to hinder travel of liquid along the shaft between said flanges.

13. In combination, a shaft having a pair of flanges facing each other, a pair of rings yieldingly pressed against said flanges, a carrier for said rings, yieldable packing between the carrier and one of the rings to prevent the travel of liquid therebetween, and means for conducting a lubricant between the carrier and the other of the rings to prevent travel of liquid therebetween.

14. In combination, a casing, a shaft in said casing having an annular face, a ring embracing the shaft and having a flat end face engaging said annular face to form a fluid tight joint, spring means for holding said faces in engagement, and means including a cylindrical tubing embracing said ring and spring for preventing fluid escaping between said faces coming in contact with said spring means.

15. In combination, a casing, a shaft in said casing and having an annular face, a cylindrical carrier member embracing the shaft, a yieldable packing between the carrier and the casing, an antifriction bearing ring seated in one end of the carrier and fixed against rotation with respect thereto, a pocket in the opposite end of the carrier for receiving a spring for urging said ring into engagement with said annular face, and means fitted into the open end of said pocket and urged outwardly in it by said spring to assist said ring in sealing said shaft.

16. In combination, a casing, a shaft in said casing having a flat flange, a ring embracing the shaft and having a flat end face engaging said flat flange to maintain a fluid tight joint, a carrier member embracing said shaft and spaced therefrom for supporting said ring, and means for conducting a sealing fluid into the space between said carrier and said shaft to hinder the creepage of fluid escaping between said faces along said shaft.

17. In a non-corrosive packing gland, the combination with a shaft disposed concentrically within a hollow boss and having a pair of radial flanges spaced apart, of a ring carrier comprising a shaft cylinder embracing the shaft between said flanges, a radial flange at one end of said cylinder, a second cylinder concentric with respect to the first and overhanging said cylinder flange to form a pocket, a packing ring disposed in said pocket and bearing against one of said flanges, a soft packing member between said ring and cylinder flange, a second packing ring embracing said other shaft flange and having an annular portion projecting between said cylinders, a spring between said second ring and cylinder flange for keeping said packing rings in contact with said flanges, and means including said soft packing member and labyrinth packings on said second ring for preventing a corrosive fluid from coming into contact with said spring.

In witness whereof, I hereunto subscribe my name this 24th day of September, 1927.

HARRY E. LA BOUR.